UNITED STATES PATENT OFFICE.

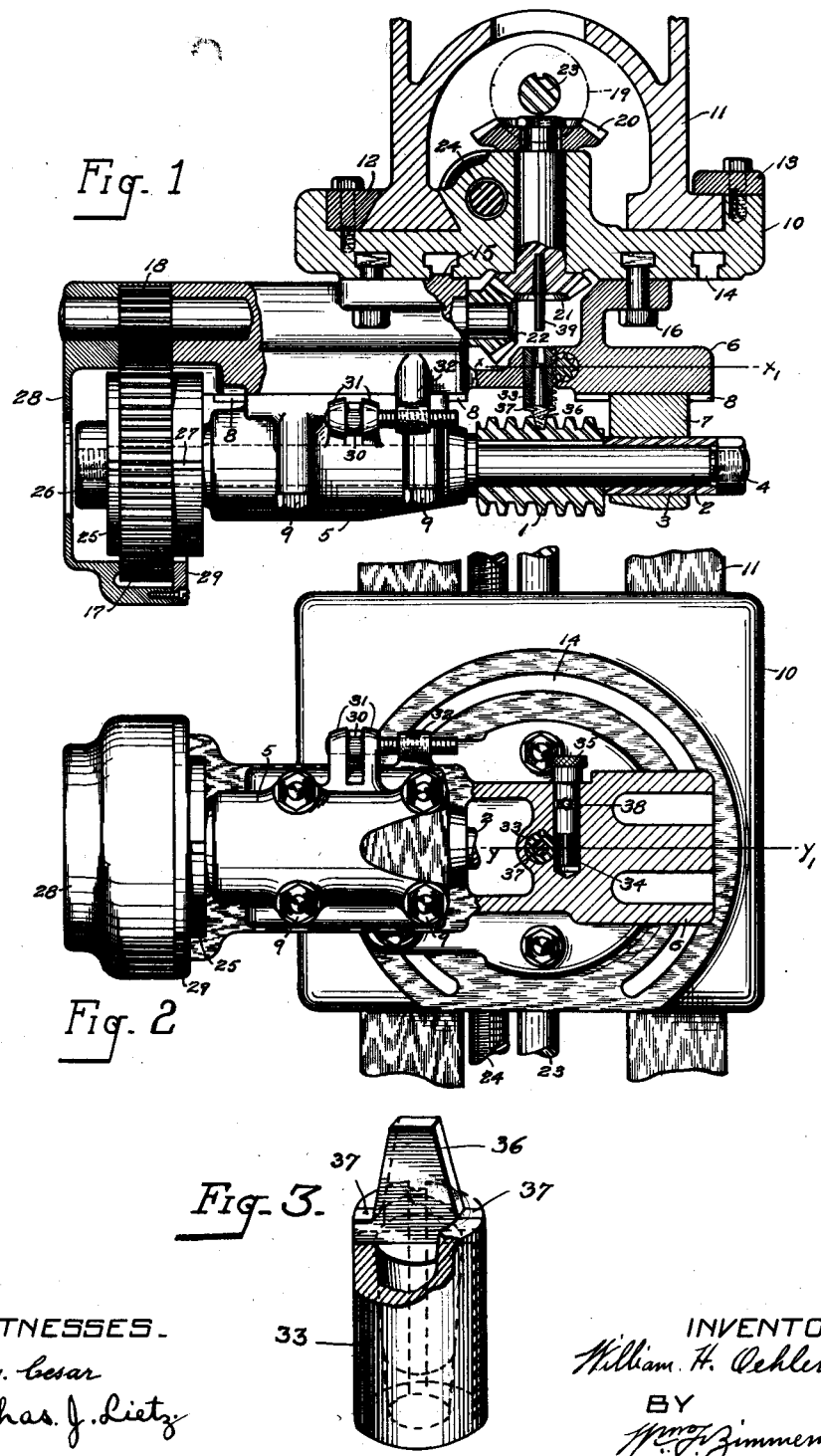

WILLIAM H. OEHLER, OF NEWARK, NEW JERSEY, ASSIGNOR TO GOULD & EBERHARDT, OF NEWARK, NEW JERSEY, A CORPORATION OF NEW JERSEY.

DEVICE FOR SETTING CUTTERS.

1,034,927. Specification of Letters Patent. Patented Aug. 6, 1912.

Application filed August 11, 1909. Serial No. 512,305.

*To all whom it may concern:*

Be it known that I, WILLIAM H. OEHLER, a citizen of the United States, and a resident of Newark, in the county of Essex and State of New Jersey, have invented certain new and useful Improvements in Devices for Setting Cutters; and I do hereby declare the following specification, taken in connection with the drawings forming part of the same, to be a full, clear, and exact description of the principle of said invention and the best mode in which I have contemplated applying that principle, so as to distinguish it from other inventions.

The invention relates primarily to machines employing a milling cutter and more particularly to gear cutting machines in which it is necessary to set the milling cutter central with respect to a work-arbor.

Considerable trouble has been experienced heretofore, in providing proper means to set the helical cutters central with the work-arbor, in all the angular positions that said cutter may occupy with respect to said work-arbor. In cutting gear-wheels, particularly by the hobbing method, it is essential to have a space or tooth of the helical cutter set exactly central with the gear being cut, so as to obtain symmetrical curves on each side of the teeth of the gear.

The object of the present invention is to provide a novel, simple and accurate construction, whereby a space of the helical cutter, when adjusted to any desired angular position, is readily and accurately set central with the work-arbor.

The invention comprises a sliding member having an end formed to fit between two teeth of the helical cutter and centrally located in relation to the work-arbor and means to manually actuate said member at right angles to the center line of said helical cutter.

The annexed drawings and the following description set forth in detail, certain mechanism embodying means constituting however, but one of the various mechanical forms in which the principle of the invention may be used.

The drawings, illustrating the invention in its preferred form as applied to a gear generating machine, show so much of a gear-cutting machine as is necessary to properly illustrate the invention.

The novelty will be readily understood from the following detailed description and is more particularly pointed out in the claims.

Referring now to the drawings: Figure 1 is a plan view of a cutter-carriage, partly in section and showing a section of the cutter centering arrangement, at Y Y, of Fig. 2. Fig. 2 is an elevation of said cutter-carriage with the device for setting the cutter in section at X X of Fig. 1. Fig. 3 is a perspective view, partly in section, of the formed cutter gage and the spindle therefor.

Referring now to the drawings the helical-cutter (1) is keyed to the cutter-spindle (2) and clamped thereto by means of the bush (3) and nut (4). The cutter-spindle (2) is rotatably mounted in a longitudinally adjustable bearing (5) mounted upon the angularly adjustable slide (6). An end bearing (7) is provided, upon said slide (6), to support the outer end of the cutter spindle (2). Both cutter-spindle bearings (5) and (7) are arranged to slide on the angularly adjustable slide (6) and are guided by a tongue (8) fitting a groove in each. T bolts (9) are provided in each of said bearings to clamp them securely to the slide (6) in its rotary movement, when properly adjusted.

The angularly adjustable slide (6) is mounted upon the cutter-carriage (10) which is arranged to reciprocate upon the guideways of the main frame (11) and held to said frame by the gib (12) and straps (13). The cutter-carriage (10) is actuated by a feed screw (24) engaging a threaded portion therein and the screw (24) is connected to a suitable feeding mechanism not shown.

Circular T-shaped grooves (14) are formed within the carriage (10) into one of which a circular tongue (15), on the slide (6) is extended to form a guide for said slide (6). T bolts (16) are provided in each of said grooves to securely clamp the slide (6) to the carriage (10) when in any desired angular position.

The helical cutter (1) is rotated by the gear (17) in engagement with the pinion

(18) which is rotatably mounted in the slide (6) and rotated by the bevel gears (19), (20), (21) and (22) forming a central driving arrangement to rotate the cutter when adjusted to any angular position. The bevel gear (19) is splined to the vertical cutter drive shaft (23) which is connected to any suitable source of power.

The cutter spindle 2 is connected to the gear 17 by the slidable center 25, keyed to said spindle and held thereto from endwise movement by the nut 26, and slidably keyed to said gear 17 by the keys 27 provided on the outer periphery thereof, whereby said cutter spindle 2 is adjusted endwise through the gear 17 without destroying the driving connection therewith. The gear 17 is held from moving endwise by the cap 28 secured to the slide 6, and the ring 29 bolted to said cap 28.

To adjust the helical cutter 1 in an axial direction, an adjusting screw 30 is provided with the head thereof arranged between two abutments 31 on the spindle bearing 5, and the threaded end engaging with a tapped projection 32 on the slide 6. To adjust the cutter in the direction of its axis, the bolts 9 in the bearing 5 are released and the bearing spindle and cutter are adjusted in either direction by simply turning the adjusting screw 30, and when so adjusted the bearing 5 is again securely clamped to the slide 6 by tightening the bolts 9.

The device for setting a space of the cutter 1 central, with the axis of the gear to be cut or with the work arbor, is arranged in the center of the slide 6 so as to always remain central regardless of the angular position of the axis of the cutter with the work arbor. The device consists of a spindle 33 arranged to slide perpendicular to the axis of the cutter and keyed within the center of the angularly adjustable slide 6. One side of said spindle 33 is provided with rack teeth to be engaged by a pinon 34 rotatably mounted at right angles to said spindle and held within the slide 6 by the screw 38. The pinion 34 extends outward through the slide 6, and is provided with a knurled knob 35 by means of which said pinion 34 is rotated and said spindle 33, moved toward or away from the cutter 1. The spindle 33 is provided with a taper hole, into which a gage 36 is arranged to fit. The gage 36 is flat on the one end and formed to the shape of a space between two teeth of the cutter, which is usually a rack tooth. Two projections 37 are arranged on the flat end of the gage 36 to fit into a groove cut across the spindle 33, whereby the flat portion of the gage 33 is always held in a plane parallel with the axis of the cutter. A pin 39 is secured in the bevel gear 21 to form an ejector for the gage 36, whereby the gage 36 is readily removed, when the spindle 33 is brought into the extreme rear position. The gage 36 and spindle 33 are preferably made separate to allow the use of different shaped gages or of similar shaped gages to cover a wide range of pitches. The spindle and gage could, however, be made in one piece without departing from the spirit of the invention.

To set a space of the cutter central with the work arbor, the cutter and spindle bearing, 5, are adjusted longitudinally upon the slide 6 by means of the adjusting screw 30 until the gage 36 when brought in contact with the cutter by means of the pinion 34, fits exactly into a space of the cutter. The spindle bearing 5 is then secured to the slide 6 by the T bolts 9 and the gage is withdrawn. If a new gage is to be substituted, the cutter must be removed and the gage ejected by moving the same against the ejecting pin 39. By means of the device described, a space of the helical cutter is readily located centrally with relation to the work arbor when said cutter occupies any angular position for cutting either spur or helical gears. Said device can also be used to set a disk cutter by altering the form of the gage to an inverted V.

Having described my invention and its mode of operation, I claim as new and desire to secure by Letters Patent:

1. The combination with a cutter, of a support therefor, a spindle slidably mounted in said support and adjustable toward and from said cutter, a gage in said spindle to locate said cutter and means in said support to eject said gage by adjusting said spindle.

2. The combination with a cutter, of a support therefor, a spindle slidably mounted in said support and adjustable toward and from said cutter, a transverse groove in said spindle and in the same plane with the axis of said cutter, and a gage in said spindle with projections to engage said groove whereby said gage is maintained in the same plane with the axis of said cutter.

3. The combination with a reciprocatory slide, of an angularly adjustable carriage, a cutter shaft rotatably mounted in said carriage and adjustable axially, a spindle slidably mounted in said carriage and adjustable toward and from said cutter, a gage in said spindle to locate said cutter axes, said gage and cutter arranged in substantially the same plane and means in said slide to eject said gage by adjusting said spindle.

4. The combination with a reciprocatory slide, of a stud rotatably mounted thereon, a carriage mounted upon said slide and angularly adjustable about said stud, a cutter shaft rotatably mounted in said carriage, and longitudinally adjustable thereon, a cutter secured thereto, a spindle mounted in said carriage, and adjustable toward and from said cutter, a gage in said spindle to locate said cutter, and an ejecting pin in said stud to eject said gage by adjusting said spindle.

5. The combination with a reciprocatory slide, of an angularly adjustable carriage, a cutter shaft rotatably mounted in said carriage and longitudinally adjustable thereon, a cutter secured thereto, a spindle mounted in said carriage, the axis whereof is in the same plane with the cutter axis, means provided in said carriage to adjust said spindle toward and away from said cutter, a gage in said spindle, and means to eject said gage by adjusting said spindle.

6. The combination with a reciprocatory slide, of an angularly adjustable carriage, a cutter shaft rotatably mounted in said carriage and longitudinally adjustable thereon, a cutter secured thereto having teeth longitudinally of the shaft, a spindle mounted in said carriage and adjustable toward and from said cutter and a gage shaped to fit between two teeth of said cutter in said spindle to locate said cutter relatively to said angularly adjustable slide.

7. The combination with a cutter having teeth arranged longitudinally thereof, of a support therefor, a gage formed to fit between two teeth of said cutter, in a plane passing through the axes of said cutter and gage, and said gage adapted to be adjusted toward and from said cutter, in said support, to locate said cutter with respect thereto.

8. The combination with a cutter, of a support therefor, a gage formed to fit the contour of said cutter in a plane passing through the axes of said cutter and gage, and said gage adapted to be adjusted toward and from said cutter, in said support, to locate said cutter with respect thereto.

WILLIAM H. OEHLER.

Witnesses:
Hugo W. Jacobson,
Wm. F. Zimmermann.